3,457,301
DISAZOMETHINE PIGMENTS
Maurice Auguste Jacques Lenoir, Paris, and Jean Denis Bernard Ligot, Arnouville-les-Gonesse, France, assignors, by mesne assignments, to Ugine Kuhlmann, Paris, France, a corporation of France
No Drawing. Filed Apr. 26, 1966, Ser. No. 545,305
Claims priority, application France, Apr. 29, 1965, 15,114; July 16, 1965, 24,860; Feb. 3, 1966, 48,253
Int. Cl. C09b 55/00
U.S. Cl. 260—519   6 Claims

ABSTRACT OF THE DISCLOSURE

Disazomethine pigments having the formula:

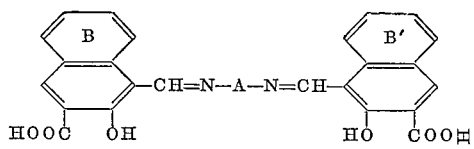

in which A represents divalent aromatic residue and the nuclei B and B' may carry substituents such as hydrogen, halogen, alkoxy or sulfo groups, mixtures of these pigments. The pigments are prepared by condensation of one molecule of an aromatic diamine with two molecules of 2-hydroxy-3-carboxy-1-napathaldehyde or derivative thereof and may be used for coloration of plastic materials, particularly polyvinyl chloride, paints, varnishes and printing inks.

---

The present invention relates to disazomethine pigments.
According to the present invention disazomethine pigments are provided of the general formula:

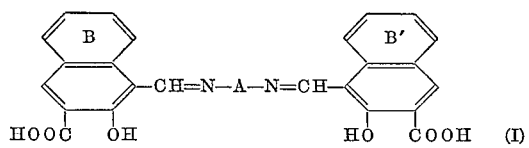

in which A represents a divalent aromatic residue and the nuclei B and B' may carry substituents, which may be the same or different. Preferred substituents are, halogen atoms and alkoxy or sulpho groups. The invention also comprises mixtures of the said pigments.

The pigments may be prepared for example by the condensation of one molecule of an aromatic diamine with two molecules of 2-hydroxy-3-carboxy-1-naphthaldehyde, or a substituted derivative of the latter.

2-hydroxy-3-carboxy-1-naphthaldehyde is described in German Patent No. 98,466 of Sept. 28, 1897, as a yellow microcrystalline powder melting at 170° C. and in German Patent No. 952,629 of May 25, 1955, as a crystalline yellow powder decomposing at 280° C.

The 2-hydroxy-3-carboxy-1-naphthaldehyde used for the condensation according to the invention may be prepared by the general method of Reimer and Tiemann by reacting chloroform with 2-hydroxy-3-naphthoic acid in the presence of sodium hydroxide, in an aqueous or aqueous alcoholic medium at the boil. It has been found that the compound so obtained, purified successively with sodium bisulphite then by recrystallisation of the free acid aldehyde from alcohol, is indeed a yellow crystalline product, but that it melts sharply at 227° C. Its elementary composition corresponds well with the empirical formula $C_{12}H_8O_4$. Its phenylhydrazone melts at 256° C. and its anil at 280° C.

Hydroxycarboxynaphthaldehydes of the general formula:

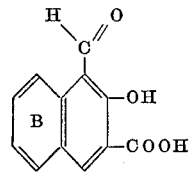

in which the nucleus B contains substituents such as for example halogen atoms, alkoxy or sulpho groups, may be prepared from substituted derivatives corresponding to 2-hydroxy-3-naphthoic acid, particularly by the reaction of Reimer and Tiemann.

The aromatic diamines which can be used separately or in admixture for the condensation according to the invention, may be represented by the general formula:

$$H_2N-A-NH_2 \quad (III)$$

in which the divalent aromatic residue A may be an arylene radical, preferably paraphenylene or 1,4-naphthylene, a diarylene radical, preferably 4,4'-diphenylene, or a radical of general formula —Ar—X—Ar'— in which X represents an atom or group of atoms linking together the Ar and Ar' radicals, while each of the amino groups on the nuclei of the latter may be in the para or meta positions with respect to the linkage X, the preferred positions however being the two para positions. X is preferably one of the following:   —CH$_2$—,   —CH=CH—,   —CO—, —CO—NH—,  —NH—CO—NH—,  —O—,  —S—, —SO—, —SO$_2$—, —S—S—, —SO$_2$—NH—, —NH—, —N=N—, —N=N-arylene-N=N—, or —N=N-diarylene-N=N—.

In all these diamines, the aromatic nuclei may carry one or more substituents such as for example halogen atoms or alkyl, alkoxy, nitro, cyano, sulpho, carboxy, or alkoxycarbonyl groups. In diamines of the type $$H_2N-Ar-X-Ar'-NH_2,$$

the nuclei of Ar and Ar' may be linked together by a direct supplementary bond in the 2,2'-position with respect to the bond X, the formula of the diamine being then of the type:

$$H_2N-\underset{X}{\text{(IV)}}-NH_2$$

The double condensation of the diamines with 2-hydroxy-3-carboxy-1-naphthaldehyde or its substituted derivatives may be carried out for example in a neutral, or preferably acid, aqueous medium or in an organic solvent such as alcohol, dimethyl formamide, xylene, chlorobenzene, o-dichlorobenzene or nitrobenzene. It is generally rapidly effected, with a quantitative yield, at a moderate temperature of the order of 50° C. to 60° C. It may in some cases be advantageous to work in a solvent or a mixture of solvents at a higher temperature, for example at 150° C. or even 200° C. and to carry out a simultaneous azeotropic distillation of the water liberated by the condensation.

The diamine may be formed even in the presence of the hydroxycarboxynaphthaldehyde in the condensation medium. This method, which provides the disazomethine pigment directly from a compound which is a precursor of the diamine, is specially advantageous when the latter is susceptible to oxidation and therefore difficult to isolate in a pure state. The diamine may be produced, for example, by reduction of the corresponding dinitro compound, in an acid suspension of the hydroxycarboxynaphthaldehyde by means of a reducing agent which is introduced in a calculated amount. An N-acyl or N,N'-diacyl derivative of the diamine may also be hydrolysed in an acid suspension of the aldehyde.

In a variant of the process of the invention, the disazomethine pigments derived from para-arylenediamines may also be prepared from monoazomethine pigments resulting from the condensation of a molecule of hydroxycarboxynaphthaldehyde with a molecule of p-acylaminoarylamine. When these pigments are deacylated in acid medium, the disazomethine pigments are formed with simultaneous elimination of paradiamine.

Another variant of the process comprising producing the disazomethine pigments from amino-monoazomethine pigments arising from the condensation of a single molecule of hydroxycarboxynaphthaledhyde with a molecule of diamine. Such monoazomethine pigments may be prepared, for example, by carrying out the condensation in alcoholic medium at low temperature (0–20° C.) and in the absence of acid. These monoazomethine pigments may be converted into disazomethine pigments by condensing with a second molecule of hydroxycarboxynaphthaldehyde. The latter may be the same as the first or may differ from it by its substituents, in which case an asymmetric disazomethine pigment is obtained. Symmetrical disazomethine pigments may also be obtained without bringing in additional aldehyde, by subjecting the amino monoazomethine compounds either to a treatment in acid medium, possibly in the hot, or even merely with the action of heat. Elimination of diamine then occurs.

Amongst the disazomethine pigments according to the invention, those which proceed from para-arylenediamines have the remarkable property of being readily formed at the expense of other azomethine pigments. If, for example, the orange pigment resulting from the condensation of two molecules of 2-hydroxy-3-carboxy-1-naphthaldehyde with a molecule of orthophenylenediamine, and paraphenylenediamine are brought together in equimolecular proportion in hot alcohol, the formation of the bluish-red disazomethine pigment of paraphenylenediamine and the simultaneous elimination of the orthophenylenediamine are found to occur. A similar phenomenon is observed with the brown disazomethine pigment derived from metaphenylenediamine, when it is mixed with paraphenylenediamine in hot alcohol.

The disazomethine pigments of the general Formula I comprise yellow, orange, red, violet and brown pigments. They have for the most part good general fastness and a high colouring power, making them suitable for very diverse applications for pigments such as for example colouration of paints, stoved varnish, printing inks, polyvinyl chloride, vinyl textile fibres, plastic materials and elastomers. As obtained by one or other of the condensation processes indicated above, the pigments of the general Formula I may be directly suitable, without further treatment, for most of these applications. A number of them are distinguished by exceptional fastness, especially to light, and by substantially complete insolubility in the usual solvents, including powerful solvents such as dimethyl formamide or dioxan. These pigments have an excellent resistance to migration, especially in polyvinyl chloride plasticised by dioctyl phthalate. They have also an excellent fastness to over-varnishing, especially in paints for car coachwork.

The pigments according to the invention may be obtained in various crystalline forms which have more or less appreciable differences in shade or in properties, according to the medium and the conditions in which they are formed. Their polymorphism is shown moreover when various treatments known for their application to other organic pigments are applied to them. Certain pigments according to the invention, prepared in aqueous medium, acquire a new form improved as to shade, colouring power and dispersibility in polyvinyl chloride when heated in an organic solvent. It has also been found that prolonged grinding in a rod mill in the presence of a mineral salt modifies the physical form and the shade of certain pigments and that they can regain their original shade by thermal treatment in an organic solvent.

Among the mixtures according to the invention, those obtained by chemical methods possess in some cases more interesting properties (brightness of shade, fastness) than mixtures obtained by simply grinding together in the same proportions the components prepared individually. Methods of obtaining them chemically comprise either condensing a mixture of diamines with 2-hydroxy-3-carboxy-1-naphthaldehyde or one of its substituted derivatives, or treating in a hot solvent a mixture of pigments of the general Formula I prepared separately. This last treatment may also be applied to pigments obtained by condensing a mixture of diamines with a naphthaldehyde.

The following examples illustrate the invention without limiting it. The parts are parts by weight unless the contrary is stated.

EXAMPLE 1

10.8 parts of paraphenylenediamine are dissolved in 160 parts of ethanol. This solution is introduced, with good stirring, into a solution of 43.2 parts of 2-hydroxy-3-carboxy-1-naphthaldehyde in 800 parts of ethanol at a temperature of 70° C. and the mixture is stirred for 30 minutes, while maintaining the temperature at 70° C. The red precipitate which is formed is filtered off, washed with alcohol and dried at 65° C. 50 parts of a red powder are obtained which is directly utilisable as a pigment.

When applied without blending in a nitrocellulose varnish, this pigment is deep red. When applied in the same varnish blended with 5 parts of titanium oxide to 1 part of pigment, it is an intense bluish red. It is also suitable for the colouration of printing inks; it gives an intense and brilliant Bordeaux shade in typographic printing.

This pigment disperses well in polyvinyl chloride plasticised witth dioctyl phthalate, which it colours a bluish red, it does not show any tendency to migration and its fastness to light is excellent. This same pigment is perfectly suitable for the colouration of bulk polyvinyl chloride textile fibres.

It also has perfect fastness to overvarnishing in a glycerophthalic-formaldehyde-melamine paint, the test being carried out at 165° C. for 30 minutes under the usual conditions for finishing car coachwork.

EXAMPLE 2

A solution is prepared of 216 parts of 2-hydroxy-3-carboxy-1-naphthaldehyde in 6000 parts of water at 70° C. with 42 parts of sodium hydroxide and 12 parts of polyethoxylated dodecyl alcohol (at the rate of 8 moles of ethylene oxide per mole of alcohol). This solution is poured into 2000 parts of water containing 450 parts of 30% hydrochloric acid and 3 parts of polyethoxylated dodecyl alcohol, at a temperature of 70° C. over a period of 15 minutes, with good stirring.

A solution of 53 parts of paraphenylenediamine in 3000 parts of water and 400 parts of 30% hydrochloric acid is introduced in a period of 15 minutes into the acid suspension of 2-hydroxy-3-carboxy-1-naphthaldehyde thus obtained and maintained at 70° C. After stirring for an hour at 70° C. the red precipitate formed is filtered off, washed with water until neutral and dried. The pigment so obtained is similar in shade to that of Example 1, but it is a little more yellowish and brighter. It has the same characteristics and is suitable for the same applications.

EXAMPLE 3

10 parts of the pigment of Example 2 are suspended in 250 parts of dimethyl formamide and the suspension is heated at 150° C. for 3 hours with stirring. After cooling, the pigment is filtered off, washed with alcohol to remove the dimethylformamide, and dried.

This treatment provides a new form of the pigment which is much more violet than the previous one. The pigment thus treated colours plasticised polyvinyl chloride a violet red shade which has excellent resistance to migration and excellent fastness to light. If the sheets of polyvinyl chloride coloured with the pigments of Examples 2 and 3 are examined by transparency tests, a difference in shade still more pronounced than that in examination by reflection is found. The shade of the pigment of Example 2 appears red and that of Example 3 distinctly violet.

EXAMPLE 4

A solution is prepared of 10.8 parts of paraphenylenediamine in 250 parts of orthodichlorobenzene. This solution is introduced in a period of 10 minutes, with stirring, into a solution maintained at 60° C. of 43.2 parts of 2-hydroxy-3-carboxy-1-naphthaldehyde in 1200 parts of orthodichlorobenzene. The mixture is then heated to 100° C. and kept at this temperature for 30 minutes, then the pigment is filtered off, washed with alcohol to remove orthodichlorobenzene, and dried. A pigment is obtained the shade of which is distinctly more bluish than that of the pigments of Examples 1 and 2 and resembles that of the pigment of Example 3.

EXAMPLE 5

30 parts of 4-aminoacetanilide are dissolved in 400 parts of ethanol. This solution is introduced with stirring into a solution of 43.2 parts of 2-hydroxy-3-carboxy-1-naphthaldehyde in 800 parts of ethanol, at a temperature of 60° C. After cooling, the yellowish red precipitate formed is filtered off and dried and 68 parts of monoazomethine pigment are obtained.

This pigment is introduced into 1500 parts of 5 N sulphuric acid, and the mixture is brought to the boil. The colour of the suspension changes from yellowish red to bluish red. After two hours of treatment, the precipitate is filtered off. A large quantity of paraphenylenediamine is found in the filtrate. The precipitate is washed with dimethyl formamide, then with alcohol, and dried. 41 parts of a pigment identical with that of Example 1 are obtained.

EXAMPLE 6

A quantity of 2-chloro-1,4-diaminobenzene sulphate corresponding to 14.2 parts of free diamine is dissolved in 300 parts of hot water. This solution is introduced, in a period of 20 minutes with stirring, into a solution of 43.2 parts of 2-hydroxy-3-carboxy-1-naphthaldehyde in 800 parts of boiling ethanol. After stirring for one hour at 60–70° C. the red precipitate is filtered off, washed with hot alcohol and dried. 53.8 parts of a red pigment are obtained which is a little more yellowish than that of Example 1 and has analogous properties. This pigment is suitable for the same application; in particular it has excellent resistance to migration in plasticised polyvinyl chloride and has an excellent fastness to light.

EXAMPLE 7

A pigment of the same chemical constitution as that of Example 6 is prepared in the following way: 17.2 parts of 2-chloro-4-nitroaniline and 43.2 parts of 2-hydroxy-3-carboxy-1-naphthaldehyde are dissolved in 800 parts of boiling ethanol. 460 parts of 30% hydrochloric acid are added, then 68 parts of stannous chloride ($SnCl_2 \cdot 2H_2O$) are gradually introduced in a period of half an hour while stirring and keeping at the boil under reflux. After maintaining at the boil for a further half hour, the red precipitate formed is filtered off, the filter cake is made into a paste in 1000 parts of ethanol, brought to the boil, filtered and the solid dried.

The red pigment thus obtained is very different from that of Example 6, having a much more violet shade. But if 10 parts of it are treated in 250 parts of dimethyl formamide at 150° C. for 2 hours, a pigment is obtained, after washing and drying, which is very similar to that of Example 6.

EXAMPLE 8

76.5 parts of 2-nitro-1,4-diaminobenzene and 216 parts of 2-hydroxy-3-carboxy-1-naphthaldehyde are introduced while stiring into 3000 parts of a mixture composed of 55% of commercial xylene and 45% of orthodichlorobenzene. The mixture is heated for a long time at the boil (148–150° C.) until the water formed in the condensation has been completely removed by azeotropic distillation. After cooling, the dark red precipitate formed is filtered off, washed successively with dimethyl formamide and ethanol, and dried. A pigment is obtained which colours varnishes in a Bordeaux shade which is very fast to light.

EXAMPLES 9 TO 24

2-hydroxy-3-carboxy-1-naphthaldehyde is condensed by one or other of the processes described in the preceding examples with the diamines in the table below, and disazomethine pigments are obtained.

| No. | Diamine | Pigment |
|---|---|---|
| 9 | 2-methyl-1,4-diaminobenzene | Bordeaux. |
| 10 | 2,5-dimethyl-1,4-diaminobenzene | Violet red. |
| 11 | 2-methoxy-1,4-diaminobenzene | Red brown. |
| 12 | 2-methyl-5-methoxy-1,4-diaminobenzene | Violet Bordeaux. |
| 13 | 2,5-diethoxy-1,4-diaminobenzene | Lilac. |
| 14 | 2-cyano-1,4-diaminobenzene | Red. |
| 15 | 2,6-dichloro-1,4-diaminobenzene | Brick red. |
| 16 | 2,5-dichloro-1,4-diaminobenzene | Orange red. |
| 17 | 2-bromo-1,4-diaminobenzene | Do. |
| 18 | 2,6-dibromo-1,4-diaminobenzene | Red orange. |
| 19 | 3-bromo-2,5-dimethyl-1,4-diaminobenzene | Red. |
| 20 | 2-sulpho-1,4-diaminobenzene | Bluish red. |
| 21 | 2-carboxy-1,4-diaminobenzene | Red. |
| 22 | 2-methoxycarbonyl-1,4-diaminobenzene | Do. |
| 23 | 1,4-diaminonaphthalene | Violet. |
| 24 | 1,5-diaminonaphthalene | Red brown. |

EXAMPLE 25

A solution is prepared of 63.2 parts of 4,4'-diamino-3,3'-dichlorodiphenyl in 500 parts of dimethyl formamide. This solution is introduced in a period of 10 minutes, with stirring, into a solution of 108 parts of 2-hydroxy-3-carboxy-1-naphthaledhyde in 2000 parts of dimethyl formamide, the mixture of the solutions being effected at a temperature of 60° C. Stirring is continued for two hours while this temperature is maintained, then the red precipitate is filtered off, washed with ethanol to remove the dimethyl formamide, and dried. 161 parts of a red powder are obtained.

When applied without blending in a nitrocellulose varnish, this pigment has a beautiful deep scarlet shade. When applied in the same varnish and blended with 5 parts of titanium oxide for one part of pigment, it is orange red.

This pigment does not show any substantial tendency to migration in the plasticised polyvinyl chloride, which it colours scarlet red. It is also suitable for the colouration of polyvinyl chloride fibres, on which it gives a beautiful orange scarlet shade, and in paints for car coachwork, where its fastness to overvarnishing is perfect. Its fastness to light is excellent in all its applications.

EXAMPLE 26

108 parts of 2-hydroxy-3-carboxy-1-naphthaldehyde are dissolved in 2500 parts of water with 21 parts of sodium hydroxide and 3 parts of polyethoxylated dodecyl alcohol. The solution is poured in a period of 20 minutes, with stirring, into 4000 parts of water containing 350 parts of sulphuric acid and 4.5 parts of polyethoxylated dodecyl alcohol. This operation is carried out at a temperature of 95° C. and it provides an acid suspension of 2-hydroxy-3-carboxy-1-naphthaldehyde (suspension A).

On the other hand, an amount of 4,4'-diamino-3,3'-dichlorodiphenyl sulphate corresponding to 63.2 parts of free diamine is dissolved in 1000 parts of water at 95° C. containing 25 parts of sulphuric acid. This hot solution is introduced in a period of two minutes into suspension A, which is well stirred and maintained at 95° C. After stirring for a further hour at a temperature of 95–100° C. the pigment is filtered off, washed with water until neutral, and dried. The pigment thus obtained is similar in shade to that of Example 25. It has the same characteristics and is suitable for the same applications.

EXAMPLE 27

A solution of 25.3 parts of 4,4'-diamino-3,3'-dichlorodiphenyl in 600 parts of ethanol is introduced in a period of 5 minutes, with stirring, into a solution of 43.2 parts of 2-hydroxy-3-carboxy-1-naphthaldehyde in 800 parts of ethanol, at a temperature of 70° C. The mixture is stirred for 30 minutes, filtered and the solid washed with alcohol and dried. A pigment is obtained which, contrary to those of Examples 25 and 26, disperses with some difficulty in polyvinyl chloride. It can be dispersed in a satisfactory way, however, by means of a previous grinding in dioctyl phthalate. This pigment then gives, on blending with titanium oxide, a shade which is appreciably more yellowish than that of the pigments of the two preceding examples, and with quite as good fastness.

EXAMPLE 28

18.4 parts of benzidine are dissolved in 300 parts of hot ethanol and this solution is introduced in a period of 5 minutes into a solution of 43.2 parts of 2-hydroxy-3-carboxy-1-naphthaldehyde in 800 parts of ethanol. The operation is effected at a temperature of 70° C. which is maintained for a further few minutes. The deep red precipitate formed is filtered off, washed with alcohol and dried. This pigment colours nitro-cellulose varnish and polyvinyl chloride a deep Bordeaux. It behaves well as regards migration and light.

EXAMPLES 29 TO 35

On operating according to processes analogous to those of the preceding examples, the disazomethine pigments of 2-hydroxy-3-carboxyl-1-naphthaldehyde and diphenyl diamines are prepared, the nature of which is specified in the following table:

| No. | Diamine | Pigment |
| --- | --- | --- |
| 29 | 4,4'-diamino-3,3'-dimethyl-diphenyl | Yellowish red. |
| 30 | 4,4'-diamino-3,3'-dimethoxydiphenyl | Bordeaux. |
| 31 | 4,4'-diamino-2,2'-dichloro-3,3'-dimethoxy diphenyl. | Yellow orange. |
| 32 | 3,3'-diamino-4,4'-dichlorodiphenyl | Orange yellow. |
| 33 | 4,4'-diamino-3,3'-dinitrodiphenyl | Carmine red. |
| 34 | 4,4'-diamino-2,2',5,5'-tetrachlorodiphenyl | Orange. |
| 35 | 4,4'-diamino-3,3'-di(carboxymethoxy)-diphenyl. | Bordeaux. |

EXAMPLE 36

36.8 parts of benzidine and 75.9 parts of 4,4'-diamino-3,3'-dichlorodiphenyl are dissolved in 4000 parts of ethanol at 70° C. This solution is introduced in a period of 20 minutes, with stirring, into a solution of 216 parts of 2-hydroxy-3-carboxy-1-naphthaldehyde in 3200 parts of ethanol maintained at 70° C. After stirring for a further hour at 70° C. the precipitate is filtered off, washed with ethanol and dried. 310 parts of a scarlet red pigment are obtained. The yield is quantitative as in Examples 27 and 28, and the chemical composition of the present pigment is that of a mixture of 60% of the pigment of Example 27 and 40% of that of Example 28 (percentages expressed in molecules). If a mixture containing the same proportions of these two pigments prepared separately is compared, very distinct and characteristic differences are found. When applied in a nitrocellulose varnish, the present mixed pigment has a bright orange red shade similar to that of the pigment of Example 27, while the mixture of the same composition, produced from the pigments of Examples 27 and 28 is a much more bluish red with a shade intermediate between those of its components and duller. The same differences of shade are observed in polyvinyl chloride, in which the mixed pigment does not migrate substantially and has an excellent fastness to light, like the pigment of Example 27, while the mixture of pigments separately prepared migrates very slightly and has not such a good fastness to light.

EXAMPLE 37

10 parts of the pigment of Example 2 (derived from paraphenylenediamine) and 10 parts of the pigment of Example 26 (derived from 4,4'-diamino-3,3'-dichlorodiphenyl) are introduced into 500 parts of dimethyl formamide. The mixture is heated at 150° C. for 4 hours with stirring, then filtered and the solid washed with alcohol to remove the dimethyl formamide and dried. 20 parts of a red pigment a little more yellowish and brighter than the corresponding untreated mixture are obtained. This new pigment does not migrate substantially in the polyvinyl chloride and has an exceptional fastness to light. Its fastness properties are superior to those, already very good, of the untreated mixture.

On the other hand, if a mixture of the same composition is produced by a technique analogous to that of Example 36, a pigment of inferior fastness is obtained.

EXAMPLE 38

21 parts of 4,4'-diaminostilbene are dissolved in a mixture of 400 parts of ethanol and 140 parts of dimethyl formamide. The solution obtained is introduced in a period of 20 minutes, with stirring, into a solution kept at 60° C. of 43.2 parts of 2-hydroxy-3-carboxy-1-naphthaldehyde in 800 parts of ethanol. After stirring for a further hour, the deep red precipitate formed is filtered off, washed with ethanol and dried.

The pigment thus obtained is insoluble in most organic solvents. It colours nitrocellulose varnishes bright red, with good fastness to light, both in the unblended state and when blended with titanium oxide. It also colours polyvinyl chloride plasticised with dioctyl phthalate red and in this material shows a substantially perfect resistance to migration.

EXAMPLE 39

22.7 parts of 4,4'-diaminobenzanilide are dissolved in 400 parts of water with 65 parts of 17% hydrochloric acid (solution A).

On the other hand, 43.2 parts of 2-hydroxy-3-carboxy-1-naphthaldehyde are dissolved in 800 parts of ethanol at the boil (solution B). Solution A is introduced into solution B with good stirring. The condensation, effected at a temperature of 60° C., gives rise to an orange precipitate, which after an hour's stirring is filtered off in the hot, washed with ethanol and dried. The pigment thus obtained colours plasticised polyvinyl chloride orange, in which it has a good resistance to migration.

EXAMPLE 40

The operation is as Example 39, but solution A is replaced by a solution of 24.1 parts of 4'-amino-4-benzoylamino-3-methylaniline in 800 parts of ethanol. A pigment is obtained which colours nitrocellulose varnishes orange red, with a good fastness to light. This same pigment colours plasticised polyvinyl chloride orange, in which it shows a good resistance to migration.

The diamine used in the present example is prepared in the following way: (a) 4-nitrobenzoyl chloride is condensed with 5-nitro-2-aminotoluene in orthodichlorobenzene at 140° C., 4'-nitro-4-benzoylamino-3-methyl-nitrobenzene melting at 236° C. being obtained; (b) this dinitro compound reduced by sodium disulphide gives 4'-amino - 4 - benzoylamino - 3 - methyl - aniline melting at 98–100° C.

EXAMPLES 41 TO 47

Other diaminobenzanilides are prepared by a process analogous to that described in Example 40, by way of the dinitro compounds whose melting points are indicated below. The double condensation of the diamines with 2- hydroxy-3-carboxy-1-naphthaldehyde gives the pigments described in the following table:

| No. | Diamine | Melting point, °C. Dinitro | Melting point, °C. Diamino | Pigment |
|---|---|---|---|---|
| 41 | 4'-amino-4-benzoyl-amino-3,5-dichloro-aniline. | 240 | 252 | Orange yellow. |
| 42 | 4'-amino-4-benzoyl-amino-3-chloro-aniline. | 170 | 218–220 | Yellow orange. |
| 43 | 4'-amino-4-benzoyl-amino-3-methoxy-aniline. | 213–214 | 156 | Brown orange. |
| 44 | 3'-amino-3-benzoyl-amino-aniline. | 185 | 128 | Yellow orange. |
| 45 | 3'-amino-4'-chloro-3-benzoyl-amino-aniline. | 218 | | Orange. |
| 46 | 3'-amino-4'-chloro-3-benzoyl-amino-4-methyl-aniline. | 228–230 | | Do. |
| 47 | 3'-amino-4'-chloro-4-benzoyl-amino-3-methyl-aniline. | 228–230 | 190–192 | Orange yellow. |

EXAMPLE 48

12 parts of 4,4'-diamino-3,3'-dimethyl-azobenzene are dissolved in 400 parts of ethanol. The solution is introduced in a period of 5 minutes, with stirring, into a solution of 21.6 parts of 2-hydroxy-3-carboxy-1-naphthaldehyde in 400 parts of ethanol, the temperature being maintained at 65° C. After filtering off, the pigment is washed successively with dimethyl formamide to eliminate a little incompletely condensed azo compound, then with alcohol, and dried. The pigment thus purified colours varnishes and polyvinyl chloride a deep red shade. Its fastness to light and its resistance to migration are good.

EXAMPLES 49 TO 66

The following table describes a number of disazomethine pigments obtained by processes analogous to those of the preceding examples, the various diamines being condensed with 2-hydroxy-3-carboxy-1-naphthaldehyde at the rate of two molecules of this aldehyde to one molecule of diamine.

| No. | Diamine | Pigment |
|---|---|---|
| 49 | 4,4'-diaminodiphenylmethane | Golden yellow. |
| 50 | 3,2'-diamino-4,4'dimethoxydiphenylmethane. | Golden orange. |
| 51 | 4,4-diaminobenzophenone | Red orange. |
| 52 | 4'-amino-4-phenoxyaniline | Orange yellow. |
| 53 | 2,7-diaminodiphenylene oxide | Bordeaux red. |
| 54 | 4,4'-diaminodiphenyl sulphide | Orange yellow. |
| 55 | 4,4'-diaminodiphenyl sulphoxide | Yellow. |
| 56 | 4,4'-diaminodiphenyl sulphone | Orange yellow. |
| 57 | 2,7-diaminodiphenylene sulphone | Bordeaux. |
| 58 | 4,4'-diaminodiphenyl disulphide | Orange yellow. |
| 59 | 4'-amino-4-benzene-sulphenylaminoaniline | Yellow orange. |
| 60 | 4,4'-diaminodiphenyl urea | Brick red. |
| 61 | 4,4'-diaminodiphenylamine | Black violet. |
| 62 | 4,4'-diaminoazobenzene | Red. |
| 63 | 4,4'-diamino-2,2'-dimethyl-azobenzene | Bordeaux. |
| 64 | 4,4'-diaminobenzene-azonaphthalene | Violet. |
| 65 | 4'-amino-2'chloro-1-benzene-azo-naphthylamine. | Do. |
| 66 | bis-4,4'-(4-amino-benzene-azo)-diphenyl | Bordeaux. |

EXAMPLE 67

29.5 parts of 6-bromo-2-hydroxy-3-carboxy-1-naphthaldehyde are dissolved in 300 parts of ethanol at the boil. This solution is cooled to 70° C. and a hot solution of 5.4 parts of paraphenylenediamine in 80 parts of ethanol is introduced, with good stirring. A deep red precipitate is immediately formed. Stirring is continued for an hour while keeping the temperature at 65–70° C. The mass, at first thick, becomes more fluid and of a clearer red shade. It is filtered off, washed with alcohol and dried. The pigment thus obtained colours nitrocellulose varnishes and polyvinyl chloride red, the shade being a little more yellowish than that of the pigment of Example 1.

Its general properties are in all respects comparable to those of this pigment, and in particular its resistance to migration and its fastness to light are excellent.

The 6 - bromo - 2 - hydroxy - 3 - carboxy - 1 - naphthaldehyde used is prepared by the method of Reimer and Tiemann from 6-bromo-2-hydroxy-3-naphthoic acid. After recrystallisation from alcohol, this aldehyde melts at 254° C.

EXAMPLES 68 TO 74

In the following examples, either 6-bromo-2-hydroxy-3-carboxy-1-naphthaldehyde or one of the following aldehydes is used:

(a) 8 - methoxy - 2-hydroxy-3-carboxy-1-naphthaldehyde, melting at 230° C., obtained by the reaction of Reimer and Tiemann on 8-methoxy-2-hydroxy-3-naphthoic acid.

(b) 6 - sulpho-2-hydroxy-3-carboxy-1-naphthaldehyde, obtained by the Reimer and Tiemann reaction on 6-sulpho-2-hydroxy-3-naphthoic acid.

(c) 8 - sulpho-2-hydroxy-3-carboxy-1-naphthaldehyde, obtained by the same method from 8-sulpho-2-hydroxy-3-naphthoic acid.

The condensations of these aldehydes with the diamines are effected by processes analogous to those of the preceding examples. They give disazomethine pigments, the shade of which is indicated in the table below.

| No. | Aldehyde | Diamine | Pigment |
|---|---|---|---|
| 68 | 6-bromo-2-hydroxy-3-carboxy-1-naphthaldehyde. | 4,4'-diamino-3,3'-dichlorodiphenyl. | Scarlet. |
| 69 | do | 2-bromo-1,4-diaminobenzene. | Bordeaux. |
| 70 | do | 4,4'-diaminostilbene | Red. |
| 71 | do | 4,4'-diaminobenzanilide | Orange red. |
| 72 | 8-methoxy-2-hydroxy-3-carboxy-1-naphthaldehyde. | Paraphenylenediamine | Violet black. |
| 73 | 6-sulpho-2-hydroxy-3-carboxy-1-naphthaldehyde. | do | Bordeaux. |
| 74 | 8-sulpho-2-hydroxy-3-carboxy-1-naphthaldehyde. | do | Red. |

We claim:
1. Disazomethine compounds having one of the following formulae:

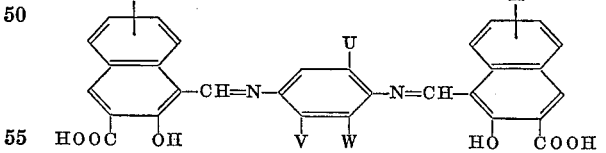

(I)

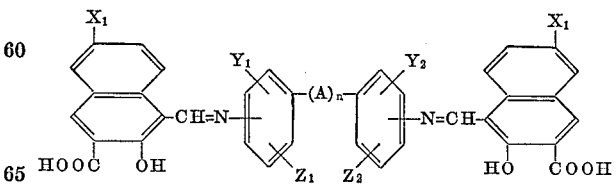

(II)

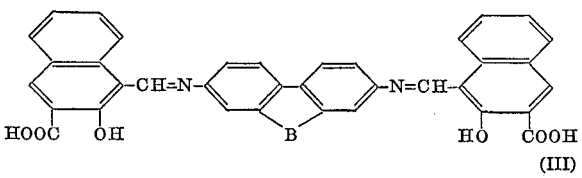

(III)

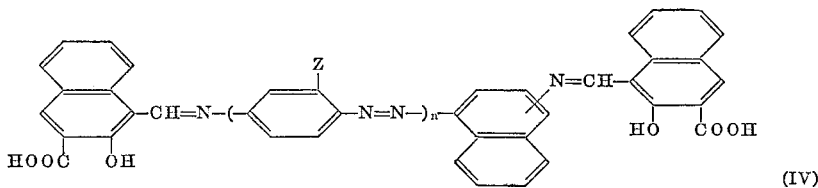

(IV)

wherein
X is hydrogen, bromine, methoxy, or sulpho,
$X_1$ is hydrogen or bromine,
U is hydrogen, bromine, chlorine, cyano, nitro, methyl, methoxy, ethoxy, sulpho, carboxy or carbomethoxy,
V is hydrogen, chlorine, methyl, methoxy or ethoxy,
W is hydrogen, bromine, or chlorine,
$n$ is 0 or 1,
Z is hydrogen or chlorine,
$Y_1$ and $Y_2$ each is hydrogen, chlorine, methyl, methoxy, nitro or carbomethoxy,
$Z_1$ and $Z_2$ each is hydrogen or chlorine,
A is oxygen, sulphur, azo, carbonamido, sulfonamido, ureido, methylene, NH, SO, $SO_2$, disulphide, CH=CH, CO or

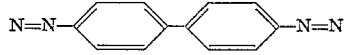

and
B is oxygen or $SO_2$.

2. Bis - 1,4 - (3-carboxy-2-hydroxynaphthylmethineazo)benzene.
3. Bis - 1,4 - (3-carboxy-2-hydroxynaphthylmethineazo)-2-chlorobenzene.
4. Bis - 1,4 - (3-carboxy-2-hydroxynaphthylmethineazo)-2-bromobenzene.
5. Bis - 4,4' - (3-carboxy-2-hydroxynaphthylmethineazo)-3,3'-dichlorodiphenyl.
6. Bis - 4,4' - (3-carboxy-2-hydroxynaphthylmethineazo)-3,3'-dimethyldiphenyl.

References Cited

UNITED STATES PATENTS

| | | | |
|---|---|---|---|
| 2,255,597 | 9/1941 | Downing et al. | 260—566 XR |
| 2,264,894 | 12/1941 | Shoemaker et al. | 260—566 XR |
| 2,276,158 | 3/1942 | Chenicek | 260—566 XR |
| 2,301,861 | 11/1942 | Downing et al. | 260—566 |
| 2,405,886 | 8/1946 | Hardman | 260—566 |
| 2,466,670 | 4/1949 | Angier | 260—519 |
| 2,611,697 | 9/1952 | Stevens et al. | 260—511 XR |
| 2,709,700 | 5/1955 | Szabo et al. | 260—566 XR |
| 2,849,487 | 8/1958 | Brust | 260—566 |
| 2,907,790 | 10/1959 | Frost | 260—566 XR |
| 3,054,824 | 9/1962 | Arrigo | 260—566 |

OTHER REFERENCES

Poddar et al.: C.A., volume 55, p. 10371e (1961).
Poddar et al.: C.A., volume 59, p. 6019b (1963).

FLOYD D. HIGEL, Primary Examiner

U.S. Cl. X.R.

8—4; 106—23, 288; 117—138.8; 260—37, 41, 181, 196, 207.1, 465, 471, 507, 509, 516